（12）United States Patent
Park

(10) Patent No.: US 7,173,769 B2
(45) Date of Patent: Feb. 6, 2007

(54) ZOOM LENS OPTICAL SYSTEM

(75) Inventor: Young-woo Park, Changwon-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 0 days.

(21) Appl. No.: 11/248,765

(22) Filed: Oct. 12, 2005

(65) Prior Publication Data
US 2006/0227430 A1 Oct. 12, 2006

(30) Foreign Application Priority Data
Apr. 8, 2005 (KR) ...................... 10-2005-0029574

(51) Int. Cl.
G02B 15/14 (2006.01)
H04N 5/262 (2006.01)
(52) U.S. Cl. .................... 359/687; 348/240.3; 359/686
(58) Field of Classification Search ............. 348/240.3, 348/240.99; 359/684, 686, 687
See application file for complete search history.

(56) References Cited

U.S. PATENT DOCUMENTS 5,694,253 A * 12/1997 Shibayama .................. 359/690
7,061,686 B2 * 6/2006 Ohtake ........................ 359/687

FOREIGN PATENT DOCUMENTS

| JP | 2001-356269 A | 12/2001 |
| JP | 2002-156581 A | 5/2002 |
| JP | 2003-043357 A | 2/2003 |
| JP | 2003-315676 A | 11/2003 |

* cited by examiner

Primary Examiner—David N. Spector
(74) Attorney, Agent, or Firm—Gardner Carton & Douglas LLP

(57) ABSTRACT

Provided is a zoom lens optical system suitable for cameras using solid state imaging devices, which is designed compact, has a high zooming ratio and telecentricity, and compensates for color aberration. The zoom lens optical system includes a first lens group having a positive refractive power, for performing zooming, a second lens group having a negative refractive power, for performing zooming, a third lens group having a positive refractive power, for performing zooming, and a fourth lens group having a positive refractive power. The first, second, third, and fourth lens groups are sequentially arranged from an object and satisfy the following equations:

$$\frac{f_T}{f_W} \geq 8.0$$

$$0.2 \leq \frac{|L_{III}|}{\sqrt{f_W \cdot f_T}} \leq 0.6,$$

where $f_W$ denotes the overall focal length of the zoom lens optical system at the wide angle position, $f_T$ denotes the overall focal length of the zoom lens optical system at the telephoto position, and $L_{III}$ denotes the amount of movement of the third lens group from the wide angle position to the telephoto position. Zooming from the wide angle position to a telephoto position is performed so that the distance between the third lens group and the fourth lens group increases.

21 Claims, 9 Drawing Sheets

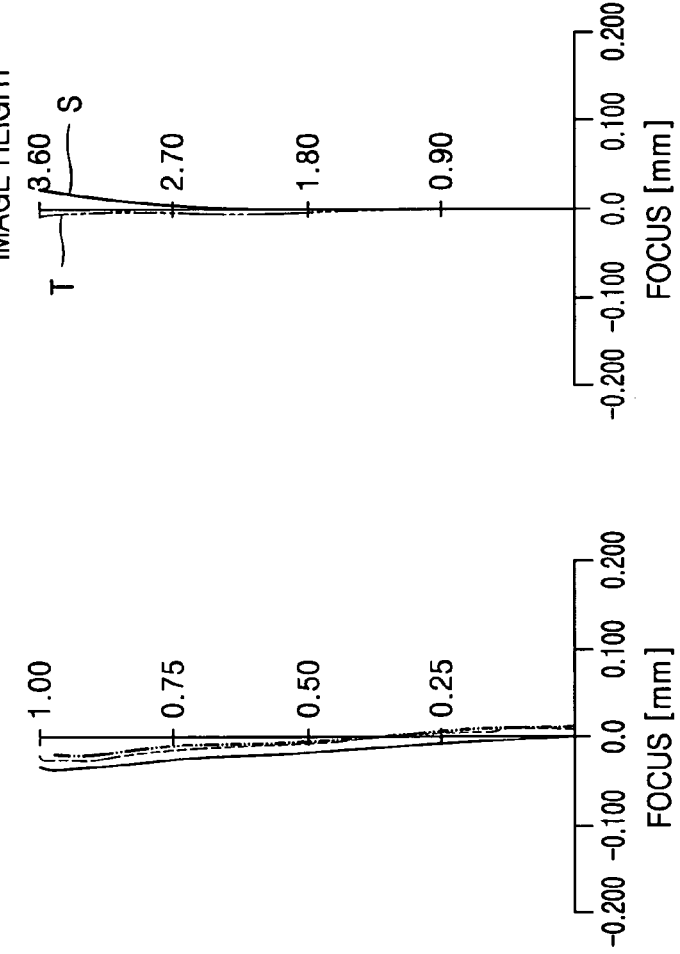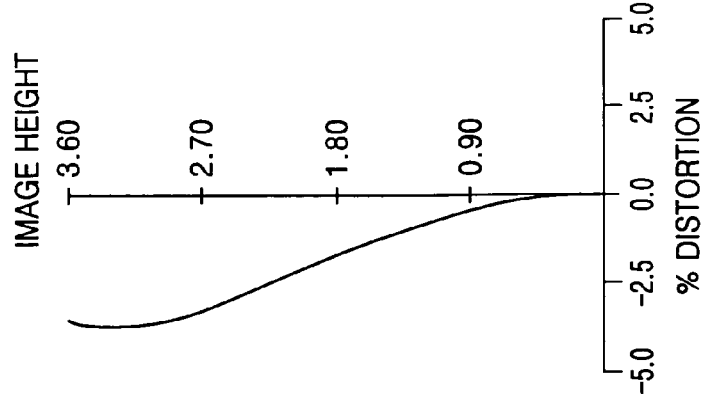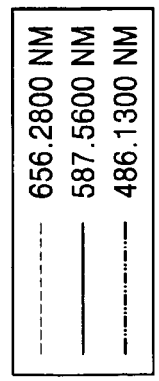

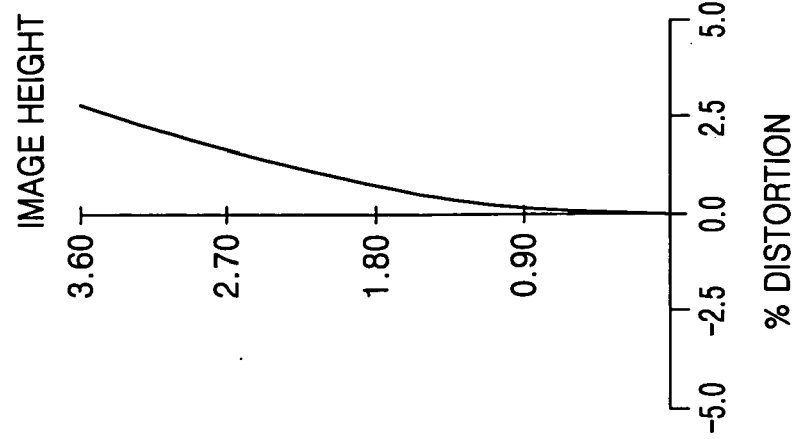
FIG. 9C
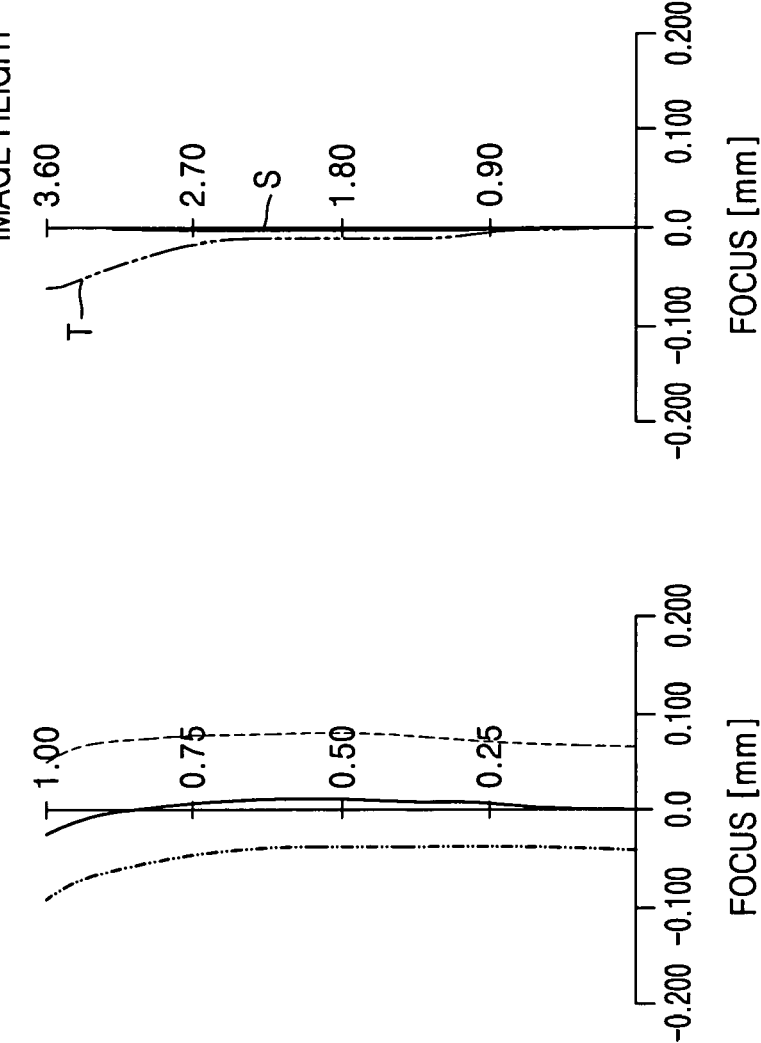
FIG. 9B
FIG. 9A
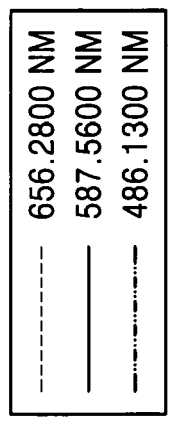

ZOOM LENS OPTICAL SYSTEM

CROSS-REFERENCE TO RELATED PATENT APPLICATIONS

This application claims the benefit of Korean Patent Application No. 10-2005-0029574, filed on Apr. 8, 2005, in the Korean Intellectual Property Office, the disclosure of which is incorporated herein in its entirety by reference.

BACKGROUND OF THE INVENTION

1. Field of the Invention

The present invention relates to a zoom lens optical system suitable for cameras that use solid state imaging devices, and more particularly, to a zoom lens optical system which is compact, has a high zooming ratio and telecentricity, and corrects a color aberration.

2. Description of the Related Art

The spread of electronic still cameras and video cameras using a solid state imaging device, such as, a charged coupled device (CCD), a complementary metal oxide semiconductor (CMOS), or the like, are rapidly extending of late. Such cameras are being developed to become cheaper, lighter, and more compact. Accordingly, a zoom lens optical system used in these cameras is also required to be less expensive, lighter, and more compact.

A camera using such a solid state imaging device employs a crystal filter to prevent the Moire phenomenon caused by a periodic structure of the solid state imaging device. Hence, a sufficiently great back focal length should be ensured in consideration of a thickness and a location of the crystal filter, and telecentricity of a ray incident upon an image plane is an important factor.

In this regard, Japanese Patent Publication No. 2003-098433 discloses a 4-group zoom lens optical system. The 4-group zoom lens optical system includes a first lens group having a positive refractive power, a second lens group having a negative refractive power, a third lens group having a positive refractive power, and a fourth lens group having a positive refractive power, which performs both aberration compensation and focusing, which are sequentially arranged from an object. The second and third lens groups perform zooming.

The 4-group zoom lens optical system comparatively satisfies a great back focal length and the telecentricity. However, the 4-group zoom lens has difficulty in producing a high-resolution image, because a large amount of aberration remains. Moreover, the 4-group zoom lens has only a zooming ratio of about 3, which does not achieve a high zoom ratio.

Japanese Patent Publication No. 2002-156581 discloses a 5-group zoom lens optical system. The 5-group zoom lens optical system includes a first lens group having a positive refractive power, a second lens group having a negative refractive power, a third lens group having a positive refractive power, and a fourth lens group having a positive refractive power, and a fifth lens group having a positive refractive power, which are sequentially arranged from an object. The 5-group zoom lens optical system performs zooming by moving the second and fourth lens groups. During this zooming, the first and third lens groups are fixed. Thus, an overall length and a size of the 5-group zoom optical system should be increased to correct optical performance when the optical system is at a wide angle position.

SUMMARY OF THE INVENTION

The present invention provides a zoom lens optical system suitable for cameras using solid state imaging devices, which is compact, has a high zooming ratio of about 8 to 12 and telecentricity, and corrects color aberration.

According to an aspect of the present invention, there is provided a zoom lens optical system including a first lens group having a positive refractive power, for performing zooming, a second lens group having a negative refractive power, for performing zooming, a third lens group having a positive refractive power, for performing zooming, and a fourth lens group having a positive refractive power. The first, second, third, and fourth lens groups are sequentially arranged from an object and satisfy the following formulas:

$$\frac{f_T}{f_W} \geq 8.0$$

$$0.8 \leq \frac{f_{III}}{\sqrt{f_W \cdot f_T}} \leq 1.2$$

where $f_w$ denotes the overall focal length of the zoom lens optical system at the wide angle position, $f_T$ denotes the overall focal length of the zoom lens optical system at the telephoto position, and $f_{III}$ denotes the focal length of the third lens group. When zooming from a wide angle position to a telephoto position, the distance between the third and fourth lens groups increases.

The zoom lens optical system satisfies the following formula:

$$2 \leq \frac{D_{T(III)}}{D_{W(III)}} \leq 6$$

wherein $D_{W(III)}$ denotes the distance between the third and fourth lens groups on the optical axis at the wide angle position, and $D_{T(III)}$ denotes the distance between the third and fourth lens groups on the optical axis at the telephoto position.

According to another aspect of the present invention, there is provided a zoom lens optical system including a first lens group having a positive refractive power, for performing zooming, a second lens group having a negative refractive power, for performing zooming, a third lens group having a positive refractive power, for performing zooming, and a fourth lens group having a positive refractive power. The first, second, third, and fourth lens groups are sequentially arranged from an object and satisfy the following formulas:

$$\frac{f_T}{f_W} \geq 8.0$$

$$2 \leq \frac{D_{T(III)}}{D_{W(III)}} \leq 6$$

wherein $f_w$ denotes an overall focal length of the zoom lens optical system at the wide angle position, $f_T$ denotes an overall focal length of the zoom lens optical system at the telephoto position, $D_{W(III)}$ denotes the distance between the third and fourth lens groups on the optical axis at the wide angle position, and $D_{T(III)}$ denotes the distance between the third and fourth lens groups on the optical axis at the telephoto position. Thus, when zooming from a wide angle position to a telephoto position, the distance between the third and fourth lens groups increases.

BRIEF DESCRIPTION OF THE DRAWINGS

The above and other features and advantages of the present invention will become more apparent by describing in detail exemplary embodiments thereof with reference to the attached drawings in which:

FIGS. 2A, 2B, and 2C show a spherical aberration, an astigmatic field curvature, and a distortion, respectively, of the zoom lens optical system of FIG. 1A at the wide angle position;

FIGS. 9A, 9B, and 9C show a spherical aberration, an astigmatic field curvature, and a distortion, respectively, of the zoom lens optical system of FIG. 7A at the telephoto position.

DETAILED DESCRIPTION OF THE INVENTION

Figure 1A:
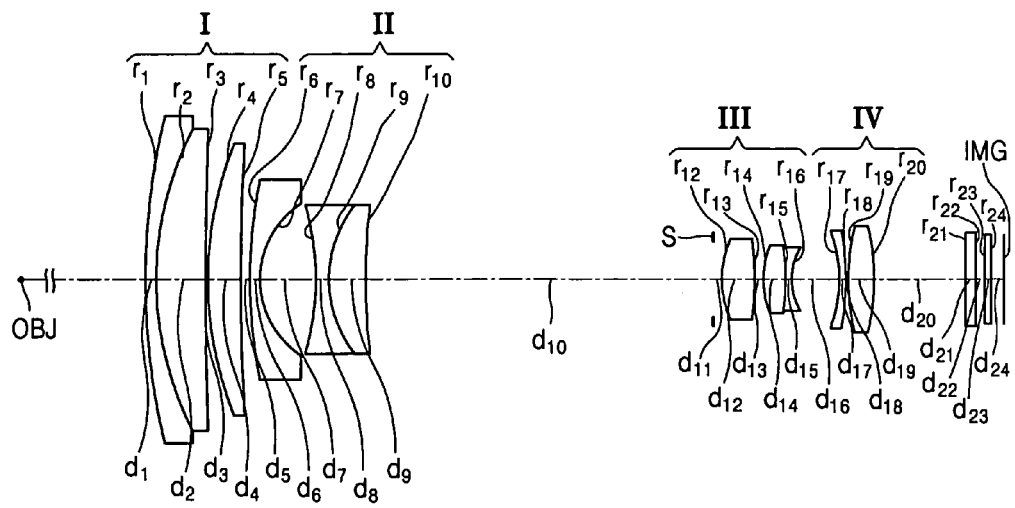
FIG. 1A is a cross-sectional view illustrating an optical configuration of lenses of a zoom lens optical system according to an embodiment of the present invention at a wide angle position.
Figure 1B:
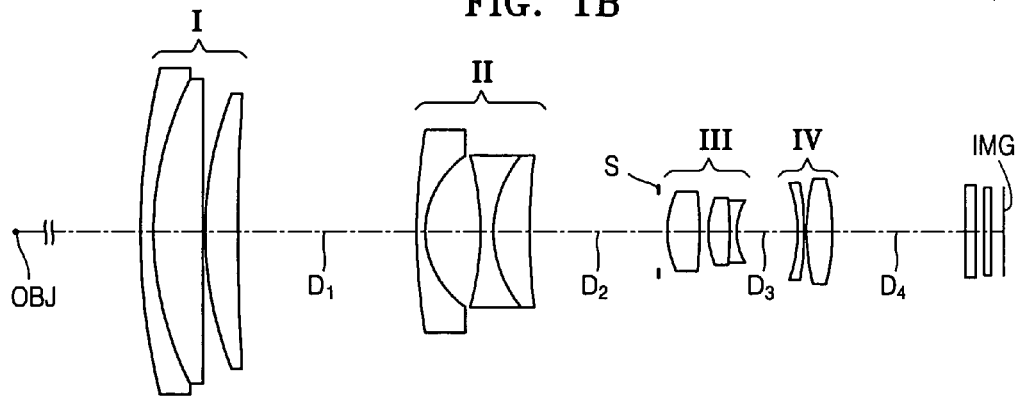
FIG. 1B is a cross-sectional view illustrating an optical configuration of the lenses of the zoom lens optical system of FIG. 1A at a medium angle position.
Figure 1C:
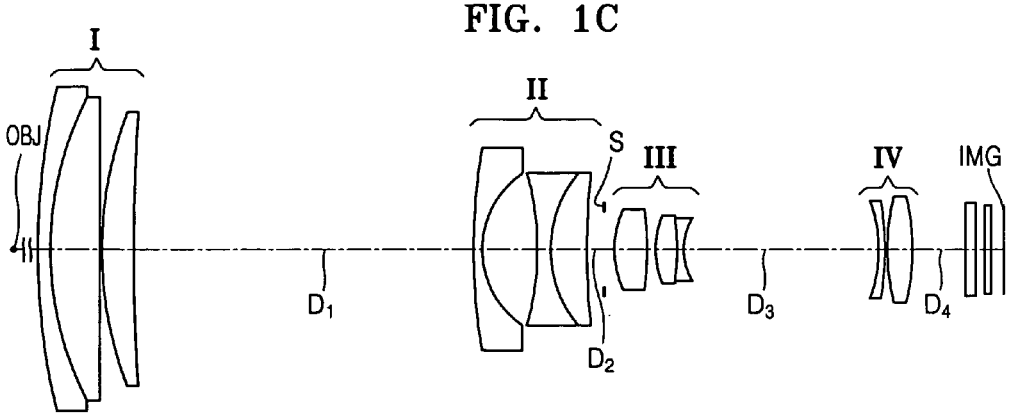
FIG. 1C is a cross-sectional view illustrating an optical configuration of the lenses of the zoom lens optical system of FIG. 1A at a telephoto position.

FIGS. 1A, 1B, and 1C illustrate lens arrangements of a zoom lens optical system according to an embodiment of the present invention at a wide angle position, a medium angle position, and a telephoto position, respectively.

Referring to FIGS. 1A, 1B, and 1C, the zoom lens optical system includes a first lens group I having a positive refractive power, a second lens group II having a negative refractive power, a third lens group III having a positive refractive power, and a fourth lens group IV having a positive refractive power, which are sequentially arranged from an object (OBJ). The zoom lens optical system further includes an aperture stop or diaphragm S, which is interposed between the second lens group II and the third lens group III; the stop moves together with the third lens group III.

The zoom lens optical system performs zooming by moving the first, second, and third lens groups I, II, and III along the optical axis and compensates for movement of the focal position caused during zooming by moving the fourth lens group IV. More specifically, the third lens group III moves on a flat trajectory toward the object during zooming, and the first and second lens groups I and II move on a convex trajectory toward an image plane IMG. Hence, the outer diameter of the first lens group I can be reduced, the overall length of the optical system can be reduced, and the aberration variation caused during zooming can be controlled. Furthermore, the lens barrel can be compact because focusing is performed using the fourth lens group IV.

In this embodiment, during zooming from the wide angle position as illustrated by the optical lens configuration of FIG. 1A to the telephoto position as illustrated by the optical lens configuration of FIG. 1C via the medium angle position as illustrated by the optical lens configuration of FIG. 1B, the third lens group III is moved so that the distance between the third lens group III and the fourth lens group IV increases. Also, during zooming, the first and second lens groups I and II are moved so that the distance between the first lens group I and the second lens group II increases and the distance between the second lens group II and the third lens group III decreases.

Compensation of the focal position depending on a position of the object, namely, focusing, together with compensation of the image plane motion caused during zooming, is performed by movement of the fourth lens group IV. In this case, a small lens group, namely, the fourth lens group IV, is used to perform focusing, so that the zoom lens optical system may be compact.

Moreover, since the fourth lens group IV has a positive refractive power, it has telecentricity required by cameras that use image forming media, such as, solid state imaging devices. Telecentricity denotes a performance by which principal ray of light rays is incident upon a photographing device perpendicular at a right angle to the photographing device.

Lens structures of the first through fourth lens groups I, II, III, and IV will now be described in greater detail.

The first lens group I includes a negative lens, a positive lens, and a positive lens which are sequentially arranged from the object OBJ. The positive lenses are formed of a highly dispersive material. Hence, the positive lenses can sufficiently correct a chromatic aberration of magnification even at a zooming ratio of about 8–12. The second lens group II includes a meniscus negative lens (which is convex toward the object), a double-concave negative lens, a meniscus positive lens (which is convex toward the object), which are sequentially arranged from the first lens group I. The lens structure of the second lens group II contributes to a minimization of a performance change caused during zooming. The third lens group III includes a positive lens having an aspherical side, a positive lens, and a negative lens which are sequentially arranged from the second lens group II. Since the third lens group III disperses a refractive power and has the positive lens with an aspherical side to obtain excellent optical performance with respect to the entire screen, spherical aberration and distortion can be minimized, and a sufficient image-forming performance suitable for high-pixel photographing devices can be obtained. The fourth lens group IV includes a negative lens and a positive lens that has an aspherical side, and corrects distortion and field curvature and performs focusing.

Preferably, the zoom lens optical system having this structure satisfies conditions defined in Equations 1 through 6:

$$\frac{f_T}{f_W} \geq 8.0 \qquad (1)$$

wherein $f_w$ denotes an overall focal length of the zoom lens optical system at the wide angle position, and $f_T$ denotes an overall focal length thereof at the telephoto position.

Equation 1 defines the ratio of the overall focal length at the wide angle position to the overall focal length at the telephoto position, that is, the zooming ratio. It is known from Equation 1 that zooming at a zooming ratio of 8 or more is possible.

Equation 2 is:

$$0.8 \leq \frac{f_{III}}{\sqrt{f_W \cdot f_T}} \leq 1.2 \qquad (2)$$

wherein $f_w$ denotes an overall focal length of the zoom lens optical system at the wide angle position, $f_T$ denotes an overall focal length thereof at the telephoto position, and $f_{III}$ denotes the focal length of the third lens group III.

Equation 2 defines the ratio of the focal length of the third lens group III to the overall focal length at the wide angle position to the overall focal length at the telephoto position. When the ratio exceeds the upper limit of Equation 2, the positive refractive power of the third lens group III is weak. In this case, the third lens group III should move a great distance during zooming under an identical condition, making miniaturization of the third lens group III difficult. On the other hand, when the ratio is less than the lower limit of Equation 2, the positive refractive power of the third lens group III is strong. In this case, correcting spherical aberration, etc., is difficult, thus causing degradation of optical performance of the zoom lens optical system.

Equation 3 is:

$$2 \leq \frac{D_{T(III)}}{D_{W(III)}} \leq 6 \qquad (3)$$

wherein $D_{W(III)}$ denotes the distance between the third and fourth lens groups on the optical axis at the wide angle position, and $D_{T(III)}$ denotes the distance between the third lens group and the fourth lens group on the optical axis at the telephoto position.

Equation 3 defines a ratio of the distance between the third lens group III and the fourth lens group IV on the optical axis at the telephoto position to the distance therebetween at the wide angle position. When the ratio exceeds the upper limit of Equation 3, the distance that the third lens group III moves during zooming increases, thereby increasing the overall length of the zoom lens optical system at the telephoto position. On the other hand, when the ratio is less than the lower limit of Equation 3, the positive refractive power of the third lens group III is too strong, making it difficult to secure the back focal length at the wide angle position and to correct astigmatism.

Equation 4 is:

$$-6 \leq \frac{D_{W(II)} - D_{T(II)}}{D_{W(III)} - D_{T(III)}} \leq -2 \qquad (4)$$

wherein $D_{W(II)}$ denotes the distance between the second and third lens groups on the optical axis at the wide angle position, and $D_{T(II)}$ denotes the distance between the second and third lens groups on the optical axis at the telephoto position.

Equation 4 defines a ratio of the difference between the distances between the second and third lens group II and III at the wide angle position and at the telephoto position to the difference between the distances between the third and fourth lens group III and IV at the wide angle position and the telephoto position. When the ratio exceeds the upper limit of Equation 4, the refractive power of the third lens group III, which performs zooming, is strong. Hence, the position of an exit pupil changes greatly, so that the telecentric angle greatly changes. On the other hand, when the ratio is less than the lower limit of Equation 4, the third lens group III moves greatly. Hence, the zoom lens optical system has a great overall length, or obtaining a high zooming ratio is difficult.

Equation 5 is:

$$0.4 \leq \frac{|f_{II}|}{\sqrt{f_W \cdot f_T}} \leq 0.6 \qquad (5)$$

wherein $f_{II}$ denotes a focal length of the second lens group.

Equation 5 defines the ratio of the focal length of the second lens group II to the overall focal length at the wide angle position and the overall focal length at the telephoto position. When the ratio exceeds the upper limit of Equation 5, the negative refractive power of the second lens group II is weak. Hence, the overall length of the zoom lens optical system is great, securing a required back focal length at the wide angle position is difficult, and spherical aberration, coma aberration, and astigmatism at the telephoto position are prone to be insufficiently corrected. On the other hand, when the ratio is less than the lower limit of Equation 5, the negative refractive power of the second lens group II is strong. Hence, telecentricity is degraded.

Equation 6 is:

$$0.2 \leq \frac{|L_{III}|}{\sqrt{f_W \cdot f_T}} \leq 0.6 \quad (6)$$

wherein $L_{III}$ denotes the amount of movement of the third lens group III from the wide angle position to the telephoto position.

Equation 6 defines a ratio of the focal length of the third lens group III to the overall focal length at the wide angle position and the overall focal length at the telephoto position. When the ratio exceeds the upper limit of Equation 6, the refractive power of the third lens group III is weak. Hence, the amount of movement of the third lens group III from the wide angle position to the telephoto position is large, and the overall length of the zoom lens optical system is great. On the other hand, when the ratio is less than the lower limit of Equation 6, the refractive power of the third lens group III is strong. Hence, securing a required back focal length at the wide angle position is difficult, and spherical aberration, coma aberration, and astigmatism at the telephoto position are prone to be insufficiently corrected.

The radius of curvature, the inter-lens distance, the refractive index, and the Abbe constant of each lens included in the zoom lens optical system according to the embodiment illustrated in FIGS. 1A through 1C are shown in Table 1, Table 2, and Table 3.

TABLE 1 f; 6.03~17.91~68.59 Fno; 2.87~3.38~4.08
2ω; 63.56~22.35~5.89

| | Radius of curvature | Thickness or Distance between lenses | Refractive index (Nd) | Abbe constant (Vd) |
|---|---|---|---|---|
| 1 | 59.46000 | 1.000000 | 1.71736 | 29.5 |
| 2 | 28.70000 | 4.110000 | 1.49700 | 81.6 |
| 3 | 1250.00000 | 0.100000 | | |
| 4 | 31.75000 | 2.740000 | 1.69680 | 55.5 |
| 5 | 151.00000 | D11 | | |
| 6 | 42.80000 | 0.800000 | 1.80610 | 33.3 |
| 7 | 7.70000 | 4.670000 | | |
| 8 | −22.50000 | 1.100000 | 1.48749 | 70.4 |
| 9 | 10.46000 | 2.930000 | 1.84666 | 23.8 |
| 10 | 47.44000 | D12 | | |
| S | Stop | 0.850000 | | |
| 12 | 8.08000 (asphere 1) | 2.550000 | 1.58322 | 59.3 |
| 13 | −51.86000 | 0.750000 | | |
| 14 | 8.18000 | 1.780000 | 1.51680 | 64.2 |
| 15 | −64.53000 | 0.550000 | 1.67270 | 32.2 |
| 16 | 5.25200 | D13 | | |
| 17 | −11.29500 | 0.600000 | 1.80518 | 25.4 |
| 18 | −22.10000 | 0.100000 | | |
| 19 | 16.49000 | 2.210000 | 1.68864 | 52.0 |
| 20 | −17.79000 (asphere 2) | D14 | | |
| 21 | ∞ | 0.800000 | 1.51680 | 64.2 |
| 22 | ∞ | 0.800000 | | |
| 23 | ∞ | 0.500000 | 1.51680 | 64.2 |
| 24 | ∞ | 1.000000 | | |
| IMG | ∞ | 0.000000 | | |

TABLE 2

Aspherical coefficient

| | K | A | B | C | D |
|---|---|---|---|---|---|
| asphere 1 | −0.274000 | −0.975061E−04 | −0.266857E−05 | 0.176160E−06 | −0.654455E−08 |
| asphere 2 | 8.200000 | 0.301661E−03 | 0.493279E−05 | −0.146776E−06 | 0.719440E−08 |

TABLE 3

| | Wide angle position | Medium angle position | Telephoto position |
|---|---|---|---|
| D11 | 0.800 | 14.764 | 28.172 |
| D22 | 28.923 | 10.762 | 1.550 |
| D333 | 3.906 | 4.903 | 16.003 |
| D444 | 7.761 | 11.159 | 4.479 |

Figure 3A:
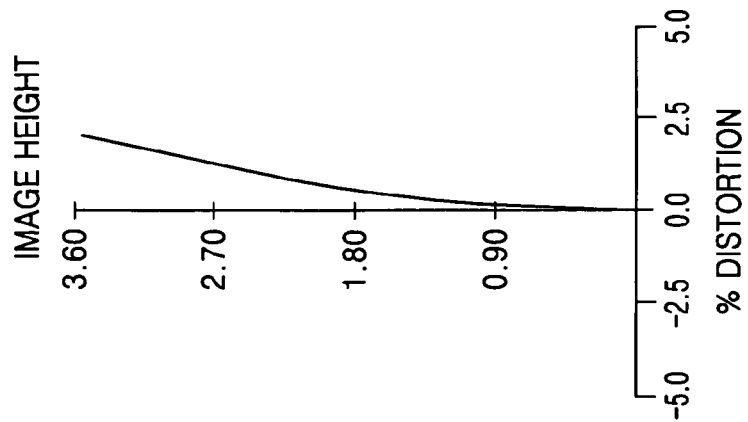
FIGS. 3A, 3B, and 3C show a spherical aberration, an astigmatic field curvature, and a distortion, respectively, of the zoom lens optical system of FIG. 1C at the telephoto position.
Figure 3B:
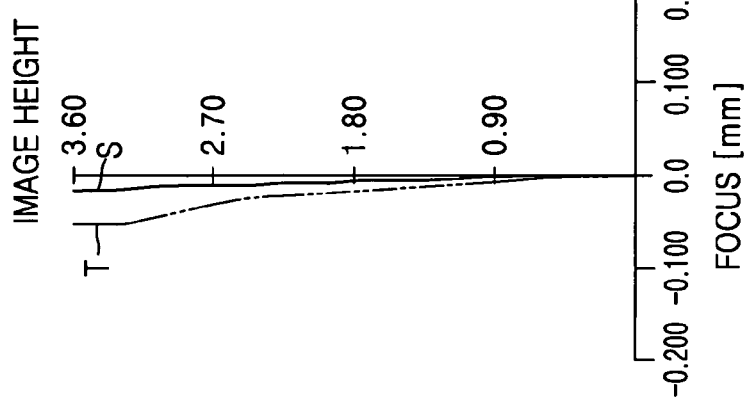
Figure 3C:
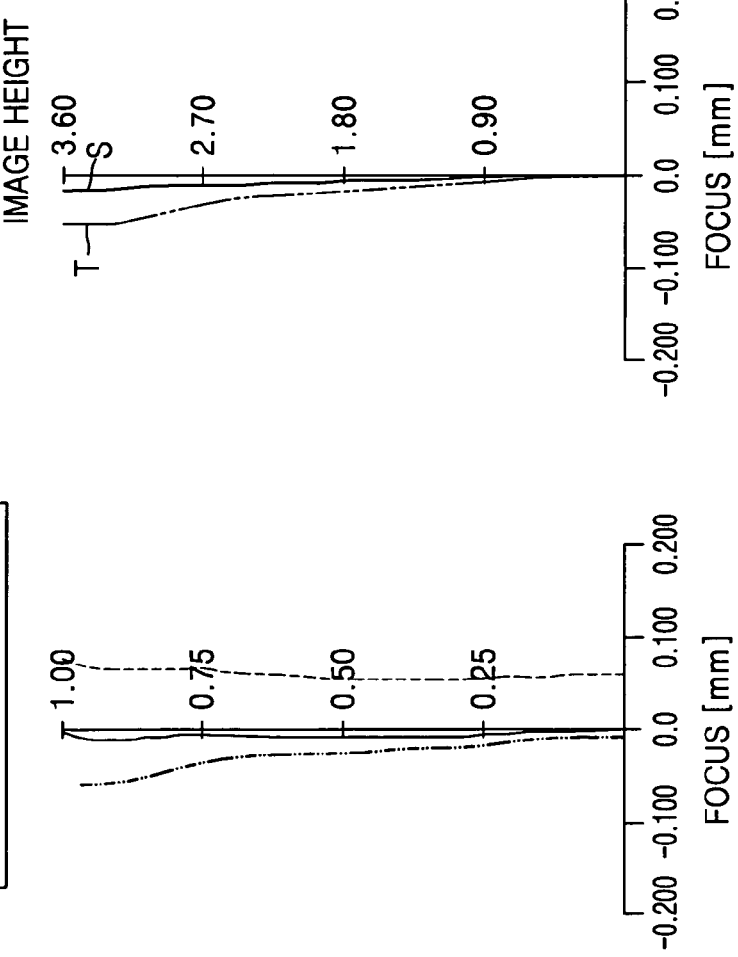

FIGS. 2A, 2B, and 2C are aberration diagrams showing the spherical aberration, the astigmatic field curvature, and the distortion, respectively, of the zoom lens optical system according to the embodiment illustrated in FIG. 1A at the wide angle position. FIGS. 3A, 3B, and 3C are aberration diagrams showing the spherical aberration, the astigmatic field curvature, and the distortion, respectively, of the zoom lens optical system according to the embodiment illustrated in FIG. 1C at the telephoto position.

In other words, FIGS. 2A and 3A show spherical aberrations of beams of various wavelengths in a tangential (i.e., horizontal) direction of an optical system. More specifically, aberrations of beams of a 486.13 nm wavelength, a 587.56 nm wavelength, and a 656.28 nm wavelength with respect to a 0.25 field, a 0.50 field, and a 1.00 field are shown in FIGS. 2A and 3A. FIGS. 2B and 3B show an astigmatic field curvature, namely, the tangential field curvature (T) and the sagittal field curvature (S). FIGS. 2C and 3C show percent distortion.

Figure 4A:
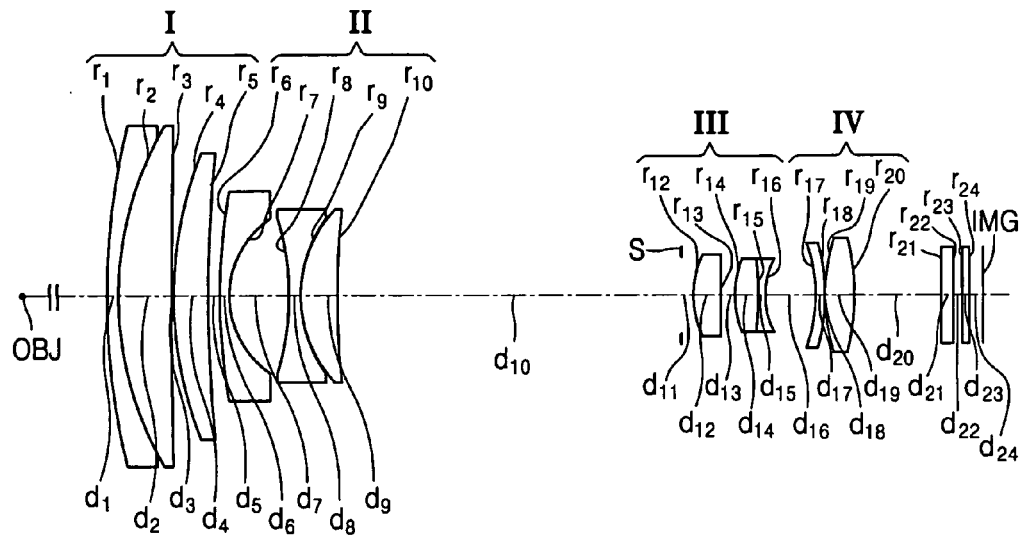
FIG. 4A is a cross-sectional view illustrating an optical configuration of lenses of a zoom lens optical system according to another embodiment of the present invention at a wide angle position.
Figure 4B:
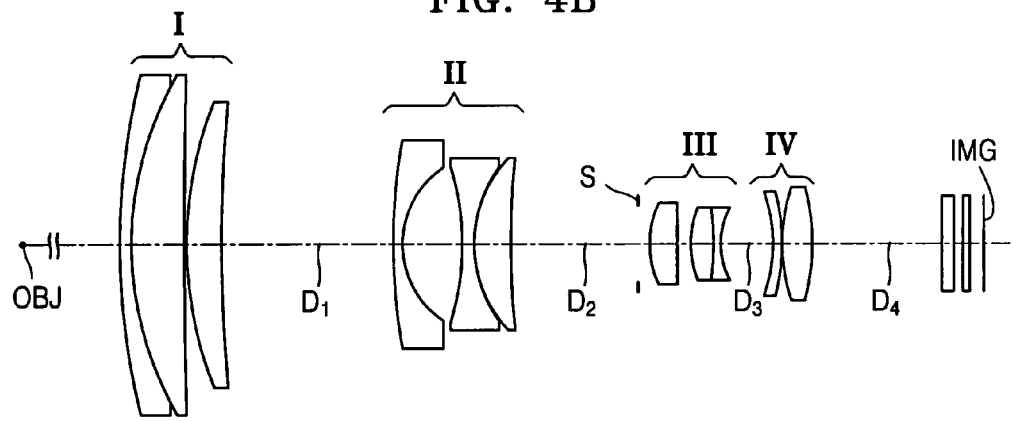
FIG. 4B is a cross-sectional view illustrating an optical configuration of the lenses of the zoom lens optical system of FIG. 4A at a medium angle position.
Figure 4C:
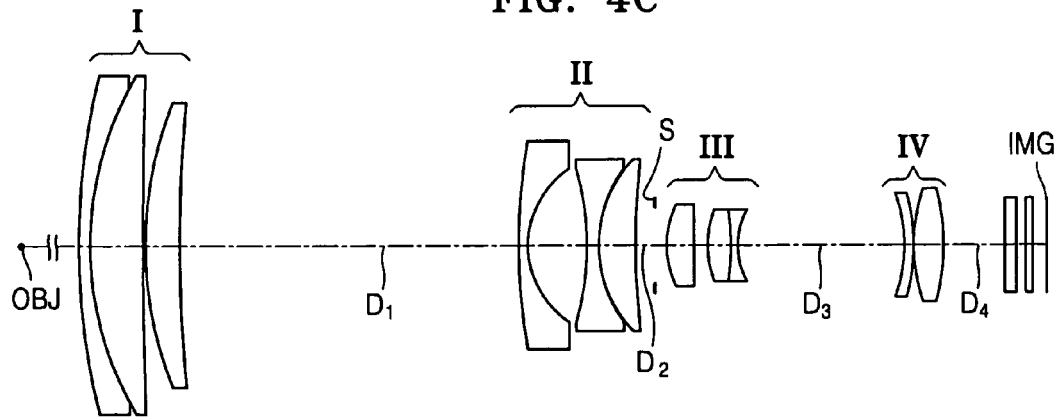
FIG. 4C is a cross-sectional view illustrating an optical configuration of the lenses of the zoom lens optical system of FIG. 4A at a telephoto position.

FIGS. 4A, 4B, and 4C are cross-sectional views illustrating optical configurations of lenses of a zoom lens optical system according to another embodiment of the present invention at a wide angle position, at a medium angle position, and at a telephoto position, respectively. Referring to FIGS. 4A, 4B, and 4C, the zoom lens optical system includes a first lens group I having a positive refractive power, a second lens group II having a negative refractive power, a third lens group III having a positive refractive power, and a fourth lens group IV having a positive refractive power, which are sequentially arranged from an object OBJ. The zoom lens optical system further includes a diaphragm or aperture stop S, which is interposed between the second lens group II and the third lens group III; the stop S moves together with the third lens group III. This zoom lens optical system is the same as the zoom lens optical system according to the embodiment illustrated in FIGS. 1A through 1C with respect to zooming of each of the lens groups, the number of lenses that constitute each of the lens groups, and zooming of each of the lenses. However, the zoom lens optical system according the present embodiment is different from the zoom lens optical system according to the embodiment illustrated in FIGS. 1A through 1C with respect to the data corresponding to the lenses constituting each of the lens groups, namely, the radius of curvature of each lens, the distance between lenses, the refractive index, and the Abbe constant. These lens data are shown in Table 4, Table 5, and Table 6.

TABLE 4 f; 6.05~17.00~58.03 Fno; 2.85~3.23~3.77
2ω; 63.37~23.78~6.95

|   | Radius of curvature | Thickness or distance between lenses | Refractive index (Nd) | Abbe constant (Vd) |
|---|---|---|---|---|
| 1 | 57.65000 | 1.000000 | 1.71736 | 29.5 |
| 2 | 27.70400 | 4.100000 | 1.49700 | 81.6 |
| 3 | 1250.00000 | 0.100000 | | |
| 4 | 29.94300 | 2.750000 | 1.69680 | 55.4 |
| 5 | 137.10000 | D21 | | |
| 6 | 43.50000 | 0.800000 | 1.80610 | 33.3 |
| 7 | 7.55000 | 4.670000 | | |
| 8 | −22.02000 | 0.860000 | 1.48749 | 70.4 |
| 9 | 10.25200 | 2.860000 | 1.84666 | 23.8 |
| 10 | 48.10000 | D22 | | |
| S | Stop | 0.850000 | | |
| 12 | 7.96100 (asphere 3) | 2.210000 | 1.58332 | 59.3 |
| 13 | −41.85200 | 0.940000 | | |
| 14 | 8.05300 | 1.860000 | 1.51680 | 64.2 |
| 15 | −28.47600 | 0.550000 | 1.67270 | 32.2 |
| 16 | 5.17500 | D23 | | |
| 17 | −10.44800 | 0.600000 | 1.80518 | 25.4 |
| 18 | −19.32400 | 0.100000 | | |
| 19 | 16.17000 | 2.230000 | 1.68864 | 52.0 |
| 20 | −16.79000 (asphere 4) | D24 | | |
| 21 | ∞ | 0.800000 | 1.51680 | 64.2 |
| 22 | ∞ | 0.800000 | | |
| 23 | ∞ | 0.500000 | 1.51680 | 64.2 |
| 24 | ∞ | 1.000000 | | |
| IMG | ∞ | 0.000000 | | |

TABLE 5

| | Aspherical coefficient | | | | |
|---|---|---|---|---|---|
| | K | A | B | C | D |
| Asphere 3 | −0.298850 | −0.105480E−03 | −0.211322E−05 | 0.120277E−06 | −0.461087E−08 |
| Asphere 4 | 7.700031 | 0.341134E−03 | 0.586345E−05 | −0.190151E−06 | 0.992250E−08 |

TABLE 6

| | Wide angle position | Medium angle position | Telephoto position |
|---|---|---|---|
| D21 | 0.800 | 13.214 | 26.103 |
| D22 | 26.853 | 9.849 | 1.550 |
| D23 | 3.916 | 4.087 | 12.901 |
| D24 | 6.942 | 10.265 | 4.960 |

Figure 5C:
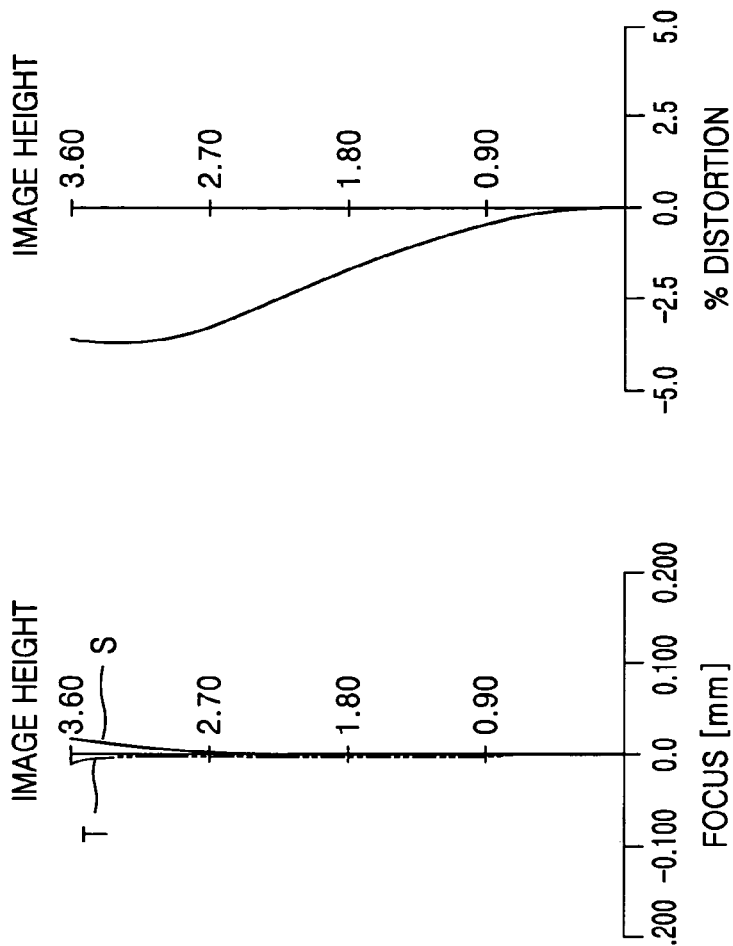
FIGS. 5A, 5B, and 5C show a spherical aberration, an astigmatic field curvature, and a distortion, respectively, of the zoom lens optical system of FIG. 4A at the wide angle position.
Figure 5B:
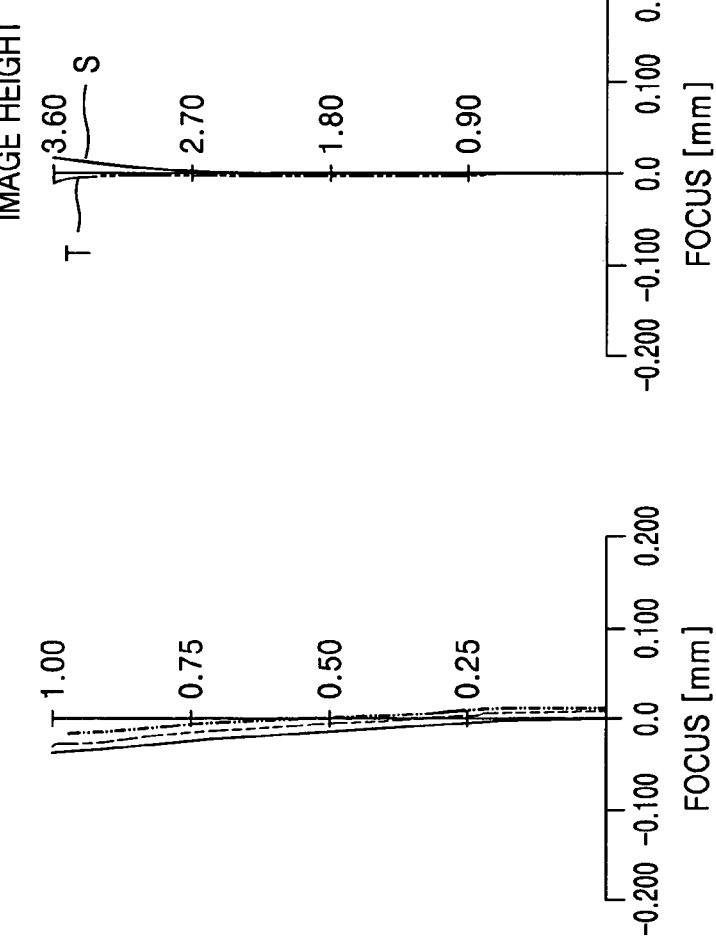
Figure 5A:
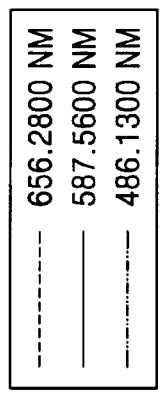
Figures 6A, 6B, 6C:
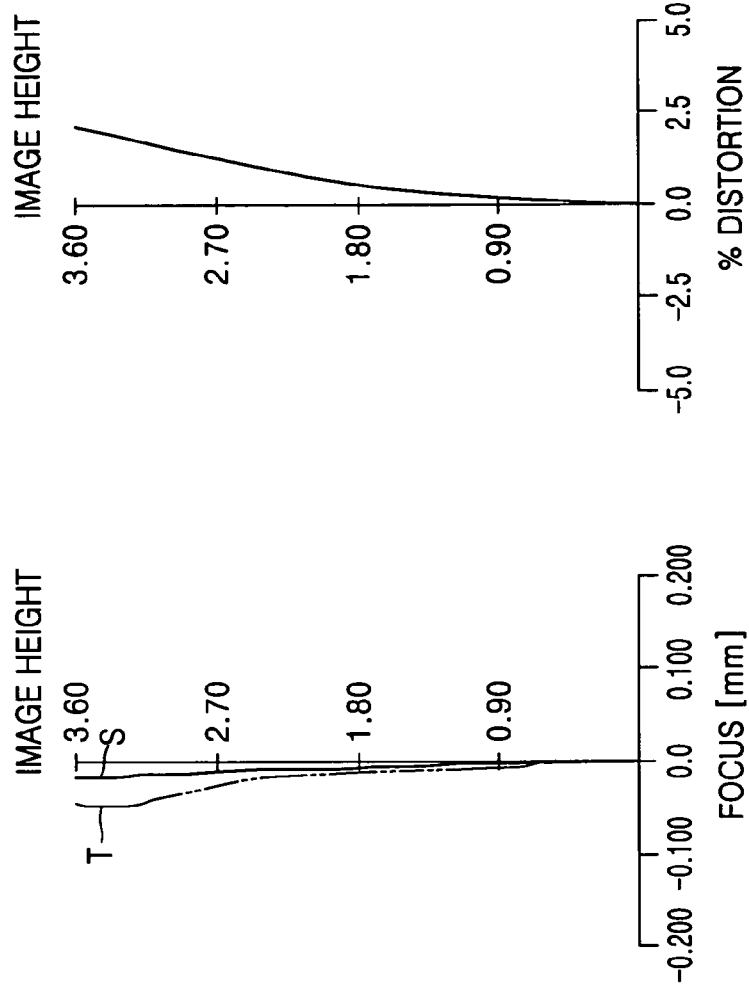
FIGS. 6A, 6B, and 6C show a spherical aberration, an astigmatic field curvature, and a distortion, respectively, of the zoom lens optical system of FIG. 4A at the telephoto position.

FIGS. 5A, 5B, and 5C are aberration diagrams showing the spherical aberration, the astigmatic field curvature, and the distortion, respectively, of the zoom lens optical system according to the embodiment illustrated in FIG. 4A at the wide angle position. FIGS. 6A, 6B, and 6C are aberration diagrams showing the spherical aberration, the astigmatic field curvature, and the distortion, respectively, of the zoom lens optical system according to the embodiment illustrated in FIG. 4C at the telephoto position.

Figure 7A:
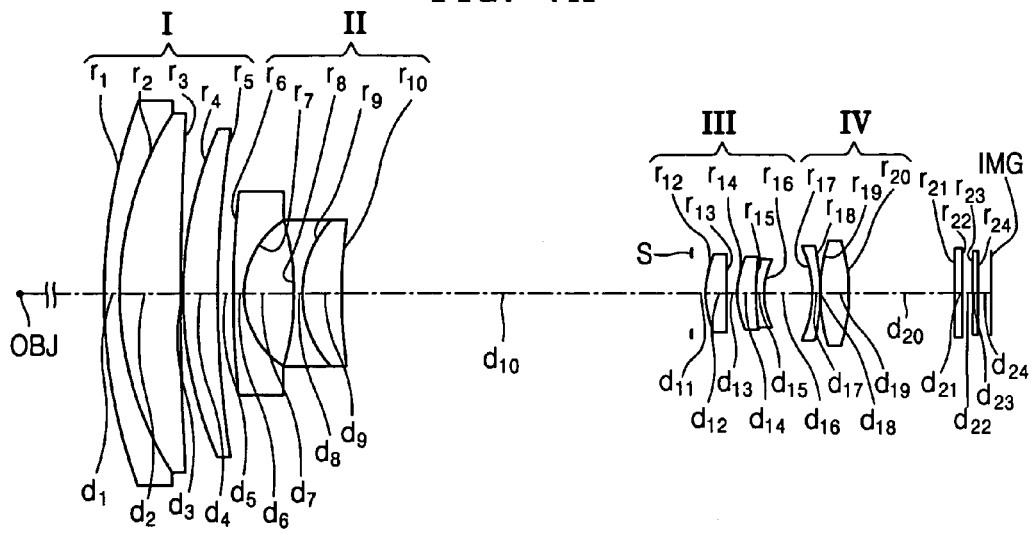
FIG. 7A is a cross-sectional view illustrating an optical configuration of lenses of a zoom lens optical system according to another embodiment of the present invention at a wide angle position.
Figure 7B:
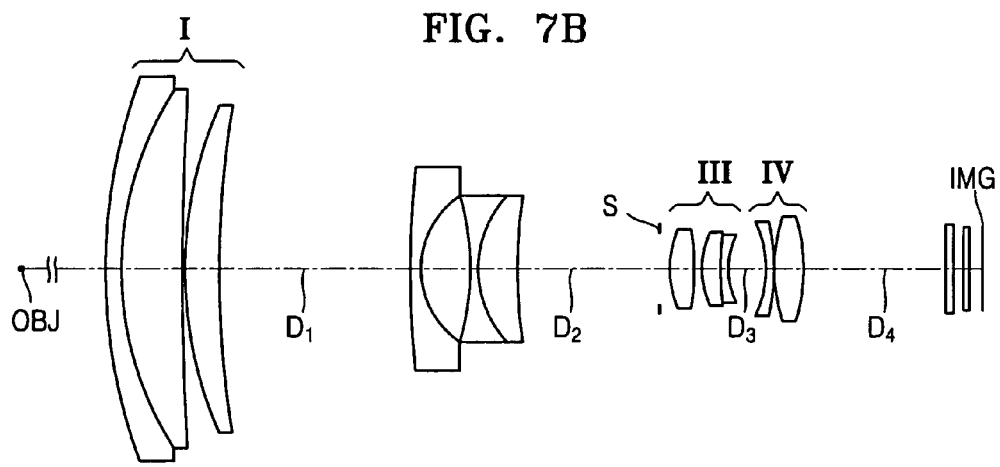
FIG. 7B is a cross-sectional view illustrating an optical configuration of the lenses of the zoom lens optical system of FIG. 7A at a medium angle position.
Figure 7C:
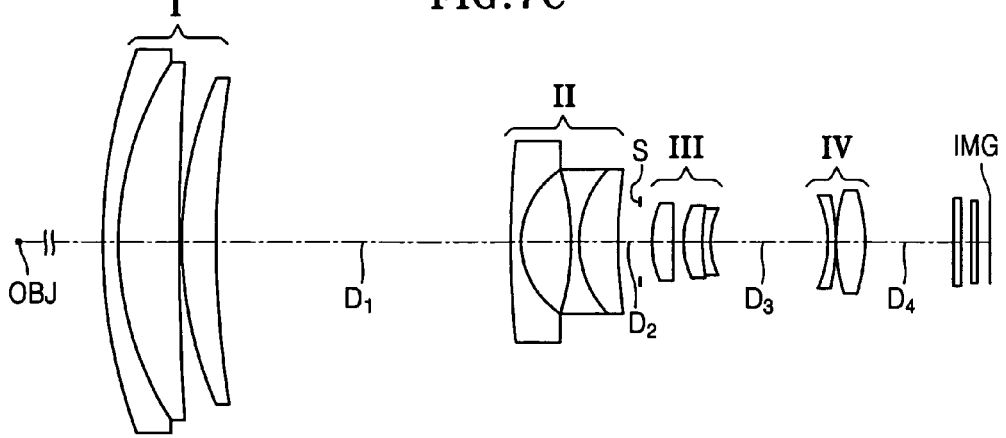
FIG. 7C is a cross-sectional view illustrating an optical configuration of the lenses of the zoom lens optical system of FIG. 7A at a telephoto position.

FIGS. 7A, 7B, and 7C are cross-sectional views illustrating optical configurations of lenses of a zoom lens optical system according to another embodiment of the present invention at a wide angle position, at a medium angle position, and at a telephoto position, respectively. Referring to FIGS. 7A, 7B, and 7C, the zoom lens optical system includes a first lens group I having a positive refractive power, a second lens group II having a negative refractive power, a third lens group III having a positive refractive power, and a fourth lens group IV having a positive refractive power, which are sequentially arranged from an object OBJ. The zoom lens optical system further includes a diaphragm or aperture stop S, which is interposed between the second lens group II and the third lens group III; the stop S moves together with the third lens group III. This zoom lens optical system is the same as the zoom lens optical system according to the embodiment illustrated in FIGS. 1A through 1C with respect to zooming of each of the lens groups, the number of lenses that constitute each of the lens groups, and zooming of each of the lenses. The zoom lens optical system according the present embodiment differs from the zoom lens optical system according to the embodiment illustrated in FIGS. 1A through 1C with respect to the data corresponding to the lenses constituting each of the lens groups, namely, the radius of curvature of each lens, the distance between lenses, the refractive index, and the Abbe constant. These lens data are shown in Table 7, Table 8, and Table 9.

TABLE 7 f; 6.26~20.69~59.97 Fno; 2.89~3.18~3.28
2ω; 61.36~19.22~6.68

|   | Radius of curvature | Thickness or distance between lenses | Refractive index (Nd) | Abbe constant (Vd) |
|---|---|---|---|---|
| 1 | 49.91000 | 1.200000 | 1.84666 | 23.8 |
| 2 | 28.62800 | 5.210000 | 1.69680 | 55.4 |

TABLE 7-continued f; 6.26~20.69~59.97 Fno; 2.89~3.18~3.28
2ω; 61.36~19.22~6.68

|   | Radius of curvature | Thickness or distance between lenses | Refractive index (Nd) | Abbe constant (Vd) |
|---|---|---|---|---|
| 3 | 363.91000 | 0.100000 | | |
| 4 | 34.01200 | 3.040000 | 1.71300 | 53.9 |
| 5 | 92.98300 | D31 | | |
| 6 | 69.42000 | 0.850000 | 1.80610 | 33.3 |
| 7 | 7.65200 | 4.270000 | | |
| 8 | −23.58300 | 0.800000 | 1.48749 | 70.4 |
| 9 | 9.77200 | 3.220000 | 1.84666 | 23.8 |
| 10 | 43.72500 | D32 | | |
| S | Stop | 1.000000 | | |
| 12 | 8.47200 (asphere 5) | 1.910000 | 1.58313 | 59.5 |
| 13 | −165.02000 | 0.780000 | | |
| 14 | 7.52100 | 1.580000 | 1.51680 | 64.2 |
| 15 | 15.43300 | 0.600000 | 1.84666 | 23.8 |
| 16 | 5.77000 | D33 | | |
| 17 | −10.89400 | 0.700000 | 1.48749 | 70.4 |
| 18 | −26.77000 | 0.100000 | | |
| 19 | 14.63900 | 2.300000 | 1.58313 | 59.5 |
| 20 | −16.79000 (asphere 6) | D34 | | |
| 21 | ∞ | 0.800000 | 1.51680 | 64.2 |
| 22 | ∞ | 0.800000 | | |
| 23 | ∞ | 0.500000 | 1.51680 | 64.2 |
| 24 | ∞ | 1.000000 | | |
| IMG | ∞ | 0.000000 | | |

TABLE 8

| | Aspherical coefficient | | | | |
|---|---|---|---|---|---|
| | K | A | B | C | D |
| Asphere 5 | −0.329022 | −0.784134E−04 | 0.151625E−05 | −0.179223E−06 | 0.606842E−08 |
| Asphere 6 | 8.916524 | 0.408302E−03 | 0.754031E−05 | −0.274330E−06 | 0.148325E−07 |

TABLE 9

| | Wide angle position | Medium angle position | Telephoto position |
|---|---|---|---|
| D31 | 1.282 | 16.004 | 24.933 |
| D32 | 29.799 | 11.887 | 1.800 |
| D33 | 4.037 | 3.270 | 9.875 |
| D34 | 8.991 | 11.949 | 7.534 |

Figures 8A, 8B, 8C:
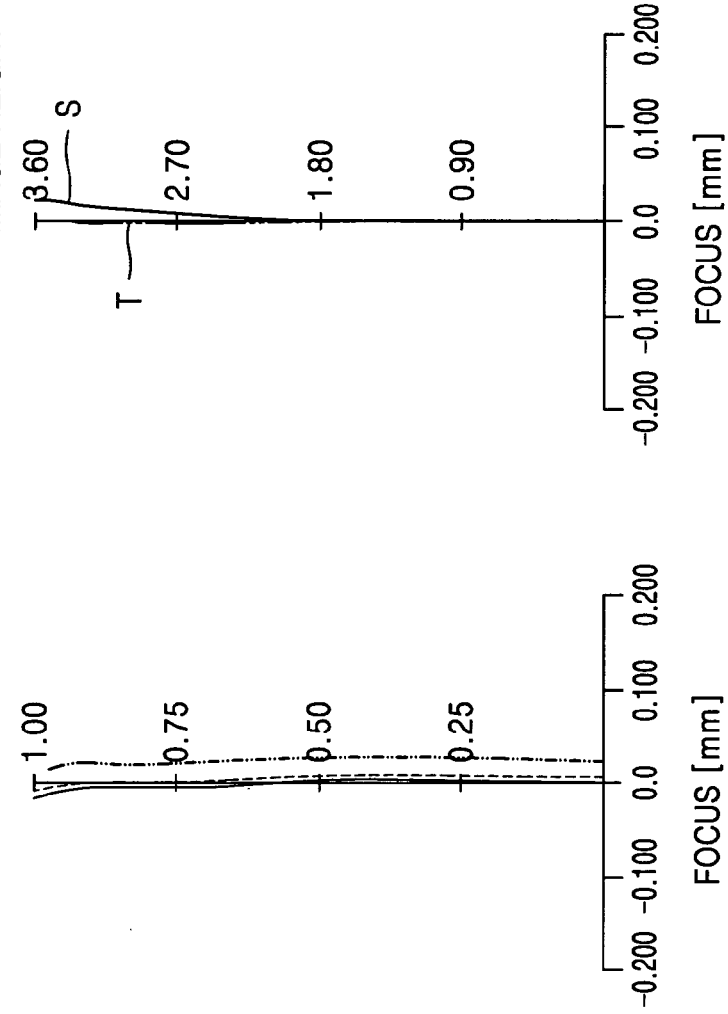
FIGS. 8A, 8B, and 8C show a spherical aberration, an astigmatic field curvature, and a distortion, respectively, of the zoom lens optical system of FIG. 7A at the wide angle position.

FIGS. 8A, 8B, and 8C are aberration diagrams showing the spherical aberration, astigmatic field curvature, and distortion, respectively, of the zoom lens optical system according to the embodiment illustrated in FIG. 7A at the wide angle position. FIGS. 9A, 9B, and 9C are aberration diagrams showing spherical aberration, astigmatic field curvature, and distortion, respectively, of the zoom lens optical system according to the embodiment illustrated in FIG. 7C at the telephoto position.

In the above-described embodiments, aspheres 1 through 6 satisfy aspherical Equation 7:

$$x = \frac{c'y^2}{1 + \sqrt{1-(K+1)c'^2y^2}} + Ay^4 + By^6 + Cy^8 + Dy^{10} \quad (7)$$

wherein x denotes the depth from a vertex of a lens to the plane of the lens in the direction parallel to an optical axis, y denotes the height from the optical axis, c' denotes a reciprocal (=1/r) of the radius of curvature at the vertex of the lens, K denotes the conic constant, and A, B, C, and D denote aspherical coefficients.

Table 10 shows values of Equations 1 through 6 in each of the embodiments illustrated in FIGS. 1A, 4A, and 7A, which are referred to as Embodiments 1, 2, and 3, respectively.

TABLE 10

| | Embodiment 1 | Embodiment 2 | Embodiment 3 |
|---|---|---|---|
| Equation 1 | 11.38 | 9.59 | 9.59 |
| Equation 2 | 0.93 | 0.95 | 1.09 |
| Equation 3 | 4.10 | 3.29 | 2.45 |
| Equation 4 | −2.26 | −2.82 | −4.80 |
| Equation 5 | 0.53 | 0.56 | 0.52 |
| Equation 6 | 0.43 | 0.37 | 0.23 |

The zoom lens optical systems according to the above-described embodiments each include first, second, third, and fourth lens groups and move the third lens group toward an object during zooming and the first and second lens groups on a convex trajectory toward an image plane. Moreover, the zoom lens optical systems satisfy Equations 1 through 6 to be designed compact and to effectively compensate for color aberration, such as, spherical aberration, astigmatic field curvature, percent distortion, etc. as shown in the above-described aberration diagrams. Furthermore, the zoom lens optical systems each have a high zooming ratio of about 8 to 12 and telecentricity and are thus suitable for cameras using solid state imaging devices.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A zoom lens optical system comprising:
   a first lens group having a positive refractive power;
   a second lens group having a negative refractive power;
   a third lens group having a positive refractive power; and
   a fourth lens group having a positive refractive power,
   wherein the first, second, third, and fourth lens groups are sequentially arranged from an object, and zooming from a wide angle position to a telephoto position is performed so that the distance between the third lens group and the fourth lens group satisfies the equations:

$$\frac{f_T}{f_W} \geq 8.0$$

-continued $$0.2 \leq \frac{|L_{III}|}{\sqrt{f_W \cdot f_T}} \leq 0.6$$

where $f_w$ denotes the overall focal length of the zoom lens optical system at the wide angle position, $f_T$ denotes the overall focal length of the zoom lens optical system at the telephoto position, and $L_{III}$ denotes the amount of movement of the third lens group from the wide angle position to the telephoto position.

2. The zoom lens optical system of claim 1, wherein the zoom lens optical system satisfies the following equation:

$$2 \leq \frac{D_{T(III)}}{D_{W(III)}} \leq 6$$

where $D_{W(III)}$ denotes the distance between the third lens group and the fourth lens group on the optical axis at the wide angle position, and $D_{T(III)}$ denotes a distance between the third lens group and the fourth lens group on the optical axis at the telephoto position.

3. The zoom lens optical system of claim 1, wherein the zoom lens optical system satisfies the following equation:

$$-6 \leq \frac{D_{W(II)} - D_{T(II)}}{D_{W(III)} - D_{T(III)}} \leq -2$$

where $D_{W(II)}$ denotes the distance between the second lens group and the third lens group on the optical axis at the wide angle position, and $D_{T(II)}$ denotes the distance between the second lens group and the third lens group on the optical axis at the telephoto position.

4. The zoom lens optical system of claim 1, wherein the fourth lens group moves during zooming to compensate for the movement of the focal position caused during zooming.

5. The zoom lens optical system of claim 1, wherein the third lens group comprises two tenses having positive refractive powers and a lens having a negative refractive power, which are sequentially arranged from the object.

6. The zoom lens optical system of claim 1, further comprising a stop between the second lens group and the third lens group, and the stop moves together with the third lens group.

7. The zoom lens optical system of claim 1, wherein at least one of the third and fourth lens groups comprises at least one aspherical lens.

8. The zoom lens optical system of claim 1, wherein the distance between the first lens group and the second lens group increases during zooming from the wide angle position to the telephoto position.

9. The zoom lens optical system of claim 1, wherein the distance between the second lens group and the third lens group decreases during zooming from the wide angle position to the telephoto position.

10. The zoom lens optical system of claim 1, wherein the zoom lens optical system satisfies the following equations:

$$0.4 \leq \frac{|f_{II}|}{\sqrt{f_W \cdot f_T}} \leq 0.6$$

-continued $$0.8 \leq \frac{f_{III}}{\sqrt{f_W \cdot f_T}} \leq 1.2$$

where $f_{II}$ denotes the focal length of the second lens group, and $f_{III}$ denotes the focal length of the third lens group.

11. A zoom lens optical system comprising:
a first lens group having a positive refractive power;
a second lens group having a negative refractive power;
a third lens group having a positive refractive power; and
a fourth lens group having a positive refractive power,
wherein the first, second, third, and fourth lens groups are sequentially arranged from an object, and zooming between the wide angle position to a telephoto position is performed so that the distance between the third lens group and the fourth lens group satisfies the equations:

$$\frac{f_T}{f_W} \geq 8.0$$

$$2 \leq \frac{D_{T(III)}}{D_{W(III)}} \leq 6$$

where $f_w$ denotes the overall focal length of the zoom lens optical system at the wide angle position, $f_T$ denotes the overall focal length of the zoom lens optical system at the telephoto position, $D_{W(III)}$ denotes the distance between the third and fourth lens groups on the optical axis at the wide angle position, and $D_{T(III)}$ denotes the distance between the third lens group and the fourth lens group on the optical axis at the telephoto position.

12. The zoom lens optical system of claim 11, wherein the zoom lens optical system satisfies the following equation:

$$-6 \leq \frac{D_{W(II)} - D_{T(II)}}{D_{W(III)} - D_{T(III)}} \leq -2$$

where $D_{W(II)}$ denotes the distance, between the second lens group and the third lens group on the optical axis at the wide angle position, and $D_{T(II)}$ denotes the distance between the second lens group and the third lens group on the optical axis at the telephoto position.

13. The zoom lens optical system of claim 11, wherein the fourth lens group moves during zooming to compensate for the movement of the focal position caused during zooming.

14. The zoom lens optical system of claim 11, wherein the third lens group comprises two lenses having positive refractive powers and a lens having a negative refractive power, which are sequentially arranged from the object.

15. The zoom lens optical system of claim 11, further comprising a stop between the second lens group and the third lens group, and the stop moves together with the third lens group.

16. The zoom lens optical system of claim 11, wherein at least one of the third and fourth lens groups comprises at least one aspherical lens.

17. The zoom lens optical system of claim 11, wherein the distance between the first lens group and the second lens group increases during zooming from a wide angle position to a telephoto position.

18. The zoom lens optical system of claim 11, wherein the distance between the second lens group and the third lens group decreases during zooming from the wide angle position to the telephoto position.

19. The zoom lens optical,system of claim 11, wherein the zoom lens optical system satisfies the following equations:

$$-6 \le \frac{D_{W(II)} - D_{T(II)}}{D_{W(III)} - D_{T(III)}} \le -2$$

where $f_{II}$ denotes a focal length of the second lens group, and $f_{III}$ denotes the focal length of the third lens group.

20. A digital imaging apparatus having a zoom lens system according to claim 1.

21. A camera having a zoom lens system according to claim 1.

* * * * *